US008286463B2

(12) United States Patent
Krulce et al.

(10) Patent No.: US 8,286,463 B2
(45) Date of Patent: Oct. 16, 2012

(54) METHOD FOR DETERMINING THE NULL POINT OF A GYROSCOPE

(75) Inventors: Darrell L. Krulce, Carlsbad, CA (US); Bin Tian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1293 days.

(21) Appl. No.: 11/696,660

(22) Filed: Apr. 4, 2007

(65) Prior Publication Data
US 2008/0246662 A1 Oct. 9, 2008

(51) Int. Cl.
*G01S 3/40* (2006.01)
(52) U.S. Cl. .......................................... 73/1.77; 342/359
(58) Field of Classification Search .................. None
See application file for complete search history.

(56) References Cited

U.S. PATENT DOCUMENTS

| | | | | |
|---|---|---|---|---|
| 4,470,124 | A | * | 9/1984 | Tagami et al. .................. 702/87 |
| 5,463,401 | A | | 10/1995 | Iwasaki |
| 6,002,364 | A | * | 12/1999 | Kroeger et al. ............... 342/359 |
| 6,272,925 | B1 | * | 8/2001 | Watson ....................... 73/504.12 |
| 6,972,724 | B1 | | 12/2005 | Tian et al. |
| 2005/0275597 | A1 | * | 12/2005 | Tian et al. ..................... 343/711 |
| 2007/0066233 | A1 | * | 3/2007 | Smith et al. ................ 455/67.11 |

FOREIGN PATENT DOCUMENTS

| | | |
|---|---|---|
| EP | 0432647 | 6/1991 |
| EP | 0452970 | 10/1991 |
| EP | 0809322 | 11/1997 |

OTHER PUBLICATIONS

Analog Devices, ±75°/s Single Chip Yaw Rate Gyro with Signal Conditioning, ADXRS401, Internet Article, (12 pages).
International Search Report, PCT/US08/059311, International Search Authority, European Patent Office, Aug. 4, 2008.
Written Opinion, PCT/US08/059311, International Search Authority, European Patent Office, Aug. 4, 2008.

* cited by examiner

*Primary Examiner* — Hezron E Williams
*Assistant Examiner* — Mark A Shabman
(74) *Attorney, Agent, or Firm* — Gerald P. Joyce, III

(57) ABSTRACT

A system for correcting angular velocity measurements from a gyroscope and using the corrected angular velocity measurements to position an antenna used with a vehicle. The system determines an approximate null point voltage of a gyroscope of the type that produces a voltage related to an angular velocity to be measured by the gyroscope. The approximate null point is determined by sampling the output voltage to obtain a plurality of sampled voltages and choosing an approximate mode of the plurality of sampled voltages as the approximate null point voltage.

48 Claims, 7 Drawing Sheets

METHOD FOR DETERMINING THE NULL POINT OF A GYROSCOPE

BACKGROUND

Field

This disclosure relates generally to systems and methods for determining a null point of a gyroscope, and more particularly, to methods and systems of the type described which may be used in an antenna position control system in conjunction with a moving vehicle.

Gyroscopes are widely known and used for navigation, direction finding, and other purposes. Gyroscopes of the type used for such purposes typically produce an output voltage that is relatable to the angular velocity to which the gyroscope is exposed so that as the gyroscope is rotated the amount of rotation can be determined. When a gyroscope of this type is not rotating, it typically produces a quiescent output voltage that is referred to as its "null point" voltage, or simply its "null point." As the gyroscope is rotated, its output voltage varies in a known manner with respect to the null point. Consequently, in the design of a system that relies upon the output voltage of a gyroscope, the null point must be accurately determined.

Unfortunately, many factors can affect the accuracy of the null point determination and introduce serious error into any system that uses the gyroscope information. For example, the manufacturing process itself often creates variations in the null point from one gyroscope to another. It would be costly to purchase any number of gyroscopes from a manufacturer to find a few with very close null points, that is, where each gyroscope has a null point almost identical to the null points of the other gyroscopes. Environmental factors, such as temperature and humidity, also can affect the accuracy of the null point determination. Even if the null point of a single gyroscope were known with precision, many gyroscopes include integrated circuits that may be affected by temperature and humidity changes. Power supply variations, particularly in mobile applications, also can affect the accuracy of the null point determination.

Even a small error in the null point can result in large errors in systems that rely on the gyroscope output. For example, if due to the use of an inaccurate null point the angular velocity measured by the gyroscope is off by 7 degrees, then this would be integrated as 7 degrees per second. Therefore, as the time of integration increases, the error would increase 7 degrees every second. Thus, the error would be 7 degrees after 1 second, 14 degrees after two seconds, and so on. It can be seen that at some point any calculation based on the inaccurate measurement would result in a final value that may be highly inaccurate. Consequently, gyroscope manufacturers sometimes go to great lengths to correct the gyroscope output to account for the various factors, temperature, supply voltage variations, and various other factors, that may influence its accuracy.

One application for gyroscopes of the type described is to position antennas on moving vehicles, such as trucks, planes, aircraft, spacecraft, trains, automobiles, construction equipment, watercraft, and the like. For example, shipping companies often have a need to communicate with their delivery vehicles as they travel throughout the country, for example, through the use of a satellite communication system. In this type of system an antenna carried on the vehicle is continuously positioned to track the satellite to send and receive communication signals therefrom. As the vehicle moves, typically a gyroscope is used to measure the angular velocity of the vehicle and produce a voltage representative of the measured angular velocity. A servo system is used to change the position of the antenna according to the output voltage from the gyroscope to keep it locked to the satellite.

Initially, it is necessary to position the antenna to acquire the satellite signal (satellite acquisition phase). One method which has been used is to move the antenna through a 360 degree arc, while taking signal strength measurements at various points throughout the arc. The antenna can then be positioned towards the satellite, based on the strongest signal strength measurement taken. If the vehicle is turning during the satellite acquisition phase, the angular velocity measurement of the gyroscope can be used to ensure that the antenna is moved through the full 360 degree arc.

Once the satellite is acquired, the position of the antenna needs to be continuously monitored to maintain its position to track the satellite. This is difficult when the vehicle is moving in essentially random directions with respect to the satellite, and the difficulty is exacerbated by the difficulty in maintaining the accuracy of the null point determination.

What is needed is a method for determining the null point of a gyroscope, particularly of gyroscopes of the type used in the positioning of a communication antenna, or the like.

SUMMARY

Disclosed are methods for determining a null point of a gyroscope of the type that produces a voltage related to an angular velocity to be measured by the gyroscope. In one embodiment, a method is provided that includes sampling the output voltage of the gyroscope to obtain a plurality of sampled voltages and choosing an approximate mode of the plurality of sampled voltages as the null point voltage. An advantage to this approach is that an external reference source, such as a satellite, tower, or the like, is not needed. Another advantage is that it does not matter if the angular velocity is changing or constant, the null point can still be quickly and easily calculated.

In another embodiment for determining the null point of a gyroscope, the output voltage is sampled to obtain a plurality of sampled voltages, assigning each sampled output voltage to a respective one of a plurality of bins, each bin representing a voltage range wherein each sampled output voltage is contained, counting a number of sampled output voltages in each bin, determining the bin with a highest count of sampled voltages, and selecting an associated voltage corresponding to a bin with the highest count of sampled voltages.

Also disclosed is an apparatus for determining a null point voltage of a gyroscope of the type that produces an output voltage related to an angular velocity to be measured by the gyroscope. The apparatus includes means for sampling the output voltage to obtain a plurality of sampled voltages and means for selecting an approximate mode of the plurality of sampled voltages as the null point voltage.

Also disclosed is a computer-readable media, which when executed by a processor, operates to determine a null point of a gyroscope. The media includes instructions for sampling the output voltage to obtain a plurality of sampled voltages, and for choosing an approximate mode of the plurality of sampled voltages as the null point voltage.

Also disclosed is a method for positioning an antenna during a satellite acquisition phase. The method includes sampling a voltage of a gyroscope related to an angular velocity measured by the gyroscope to obtain a plurality of sampled voltages, choosing an approximate mode of the plurality of sampled voltages as the null point voltage, moving the antenna through a 360 degree arc, using the calculated null point of the gyroscope to verify that the antenna moved through a full 360 degree arc, taking satellite energy measurements at discrete points throughout the full 360 degree arc, and positioning the antenna towards the satellite based on a strongest satellite energy measurement.

Also disclosed is a method for positioning an antenna used with a vehicle while the vehicle is changing directions. The method includes sampling an output voltage of a gyroscope related to an angular velocity measured by the gyroscope to obtain a plurality of sampled voltages, choosing an approximate mode of the plurality of sampled voltages as the null point voltage, moving the antenna in a first direction based upon the chosen null point, taking a first satellite energy measurement, moving the antenna in a second direction based upon the chosen null point, taking a second satellite energy measurement, comparing the first satellite energy measurement to the second satellite energy measurement to see which is stronger; and positioning the antenna based on the stronger energy measurement.

Also disclosed is a system for positioning an antenna used with a vehicle. The system includes a gyroscope for producing a voltage based on an angular velocity, means for sampling the voltage to obtain a plurality of sampled voltages, means for choosing an approximate mode of the plurality of sampled voltages as the null point voltage, and means for positioning the antenna based on the chosen null point.

Also disclosed are a system and method for correcting angular velocity measurements from a gyroscope of the type that produces a voltage related to the angular velocity. The system and method may be used, for example, to position an antenna that may be carried on a moving vehicle. For example, in one embodiment, a rotatable antenna is carried on a truck to enable communications via a satellite to a remote station. In order to correctly position the antenna towards the satellite, the approximate null point of the gyroscope is determined. The method comprises sampling the gyroscope voltage to obtain a plurality of sampled voltages and choosing an approximate mode from among the plurality of sampled voltages as the null point. The null point can then be subtracted from the gyroscope output to get a relatively accurate voltage which represents a corrected angular velocity. The corrected angular velocity can then be used to position the antenna.

BRIEF DESCRIPTION OF THE DRAWINGS

In the various figures of the drawing, like reference numbers are used to denote like parts, steps, or functions.

DETAILED DESCRIPTION

Figure 1:
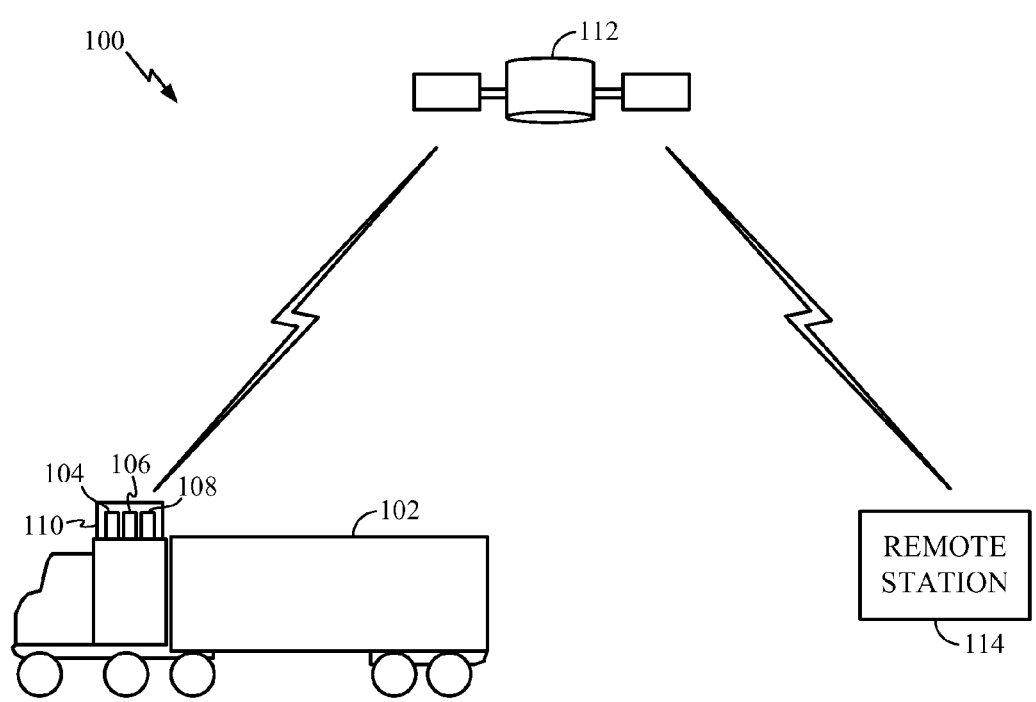
FIG. 1 shows an environment in which a system for positioning an antenna used with a vehicle may be employed.

FIG. 1 shows an environment 100 in which a system of the type described may be used for positioning a communication antenna used with a truck 102. The truck 102 carries a gyroscope 104, an antenna 106, and a servo 108, enclosed by an enclosure 110 to protect the various parts from environmental conditions. It should be understood that although the description herein is illustrated in the context of a truck 102, the principles can be applied to any type of vehicles or movable platform, such as, for instance, trucks, planes, aircraft, spacecraft, trains, automobiles, construction equipment, watercraft, and the like. The truck 102 can communicate with a remote station 114 via an antenna 106 and a communication satellite 112. The remote station 114 may be a, for example, a fleet dispatch station, an intermediate hub, an operations center, or other facility with which communications are desired. As an example, the remote station 114 may be a backend truck dispatcher, a tracking facility, or the like.

The gyroscope 104 may be electrical, mechanical, a combination of both, or a semiconductor device. For example, Analog Devices manufactures a semiconductor angular rate sensor (gyroscope), model number ADXRS401 which may be used.

The antenna 106 may be of the type that rotates through all or part of a 360 degree arc, and may facilitate both transmit and receive functions. The antenna 106 may be moved to a desired position by the servo 108 which includes a motor to drive the antenna 106 to the desired position. The degree of exactness of the movements of the antenna 106 depends at least in part on the preciseness of the servo used. For instance, if the servo 108 used can move in 5 degree increments, then the movement of the antenna 106 by the servo 108 will be limited to 5 degree increments also.

The position of the antenna 106 is controlled by the gyroscope 104 and the servo 108. The gyroscope 104 is used with the truck 102 to determine if the vehicle is changing directions, and if so, by how much. For example, the servo 108 may include a stepper-motor, and the position of the antenna relative to the vehicle 102 can be controlled by the number of steps the servo 108 makes. Then, using the direction of the truck 102 and the position of the antenna 106, the actual direction in which the antenna 106 is pointing and any necessary changes that need to be made using the servo 108 to reposition the antenna 106 can be determined.

Figure 2:
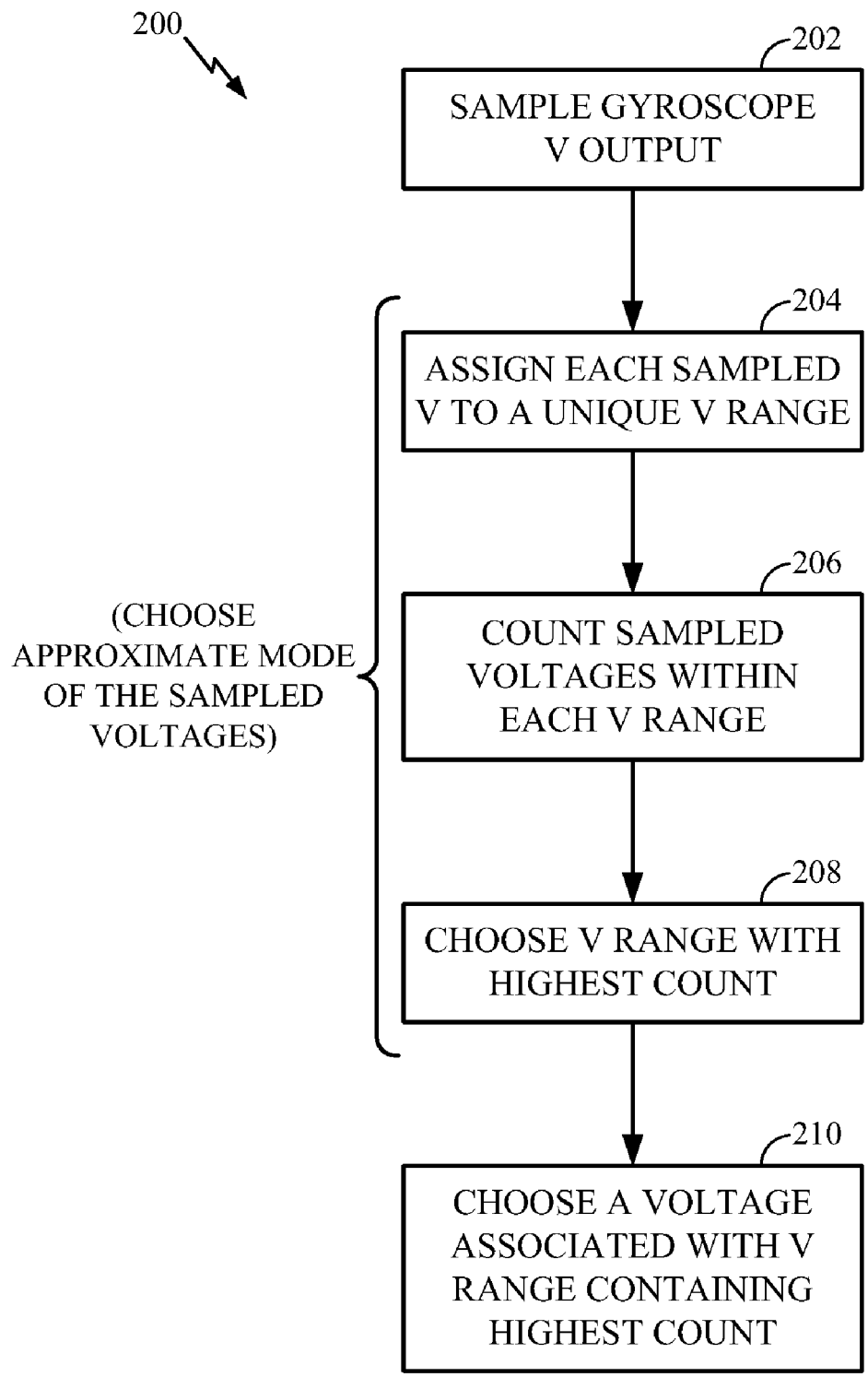
FIG. 2 shows a flow chart for one embodiment of a method to determine the null point of a gyroscope.

FIG. 2 shows a flow chart 200 for an embodiment of a method to determine the null point of the gyroscope 104. The method begins at block 202 where the voltage output (V output) of the gyroscope 104 is sampled to obtain a plurality of sampled voltages. At block 204, each sampled voltage is assigned to one of a plurality of unique voltage ranges (V ranges). The V ranges are determined by dividing the entire voltage range that can be provided at the output of the gyroscope 104 into a plurality of adjacent ranges. Although the number of ranges that are provided is a matter of design choice, the resolution of the null point determination depends on the number and width of the ranges that are defined. Consequently, the more V ranges that are defined, the higher the resolution of the null point determination, and the higher the accuracy of the gyroscope 104 that can be achieved.

At block 206, the sampled voltages that have been assigned to each V range are counted. Although shown as a discrete step, the counting of the number of sampled voltages assigned to each V range may be performed continuously as each sample is taken, or may be counted periodically. If the voltages within each V range are counted after each sample is taken, the null point may be corrected more frequently than if the count were performed periodically. Thus, the frequency of the counting can be determined in accordance with the needs of a particular application. For example, the frequency of the counting could be based on the clock speed of the processor used, or it could be based on how frequently it was desired to make a decision to move the antenna 106.

At block 208, the V range with the highest count of sampled voltages assigned to it is chosen or determined. The V range with the highest count represents the approximate mode of the sampled voltages, and is used to represent the approximate null point of the gyroscope 104. It can be seen that the accuracy of the null point approximation is dependent upon the width of the individual V ranges that are employed. However, typical servos can only move a finite number of degrees, and this limits the fine adjustments that can be made to the antenna position. Therefore, it would not be necessary to have an infinite number of V ranges, because even if a very specific voltage could be obtained, the servo used may not be able to make a move corresponding to the angular velocity that the voltage represents.

The frequency at which the highest count is determined depends on the user's application. For example, if the approximate mode is determined after each sample is taken, the gyroscope voltage could be corrected more frequently than if the approximate mode were only chosen periodically. Thus, for example, if it is desired to move an antenna 106 via the servo 108 frequently, a higher frequency might be used, for example, after each sample is taken, than if the antenna were to be moved every few seconds.

As noted, in blocks 204, 206, 208 the approximate mode of the sampled gyroscope output voltages is chosen. Once the approximate mode is found, it can be subtracted from the voltage output of the gyroscope 104 to obtain a corrected output voltage. This corrected output voltage represents an accurate angular velocity measurement from the gyroscope 104 which is substantially independent of temperature, humidity, power supply voltages, and other environmental factors to which the gyroscope may be exposed.

At block 210, a voltage associated with the range containing the highest count is chosen. This associated voltage represents the approximate null point of the gyroscope. Depending upon the width of the V ranges that are employed, a predetermined voltage within each V range may be selected as the associated voltage; that is, a single voltage may be used that will represent the entire V range. There are many ways to select the associated voltage. For instance, the low or high voltage of each range may be selected to represent the entire respective range with which it is associated. For greater precision, the low voltage of the range may be added to the high voltage of the range to obtain a voltage sum, and then the voltage sum may be divided by a predetermined number to obtain a result to represent the associated voltage. The predetermined number could be any number, for instance two, or any other number. Another way to select the associated voltage is to find an average of all of the sampled voltages within each discrete voltage range. It should be understood by those skilled in the art that there are many other ways to select the associated voltage.

As an example, two voltage ranges may be chosen, the first from 0 Volts to +1.0 Volts, and a second from +1.1 Volts to 2.0 Volts. All voltages in this example would be rounded up to the nearest 0.1 volts. It would then be determined after a certain number of samples from the gyroscope were taken, which voltage range had the highest count of sampled voltages. Assume that the highest count of sampled voltages were in the first voltage range. A voltage within the first voltage range would then be chosen to represent the first voltage range. For example, +1.5 Volts could be chosen to represent the voltage range, and, therefore, the null point of the gyroscope.

Figure 3:
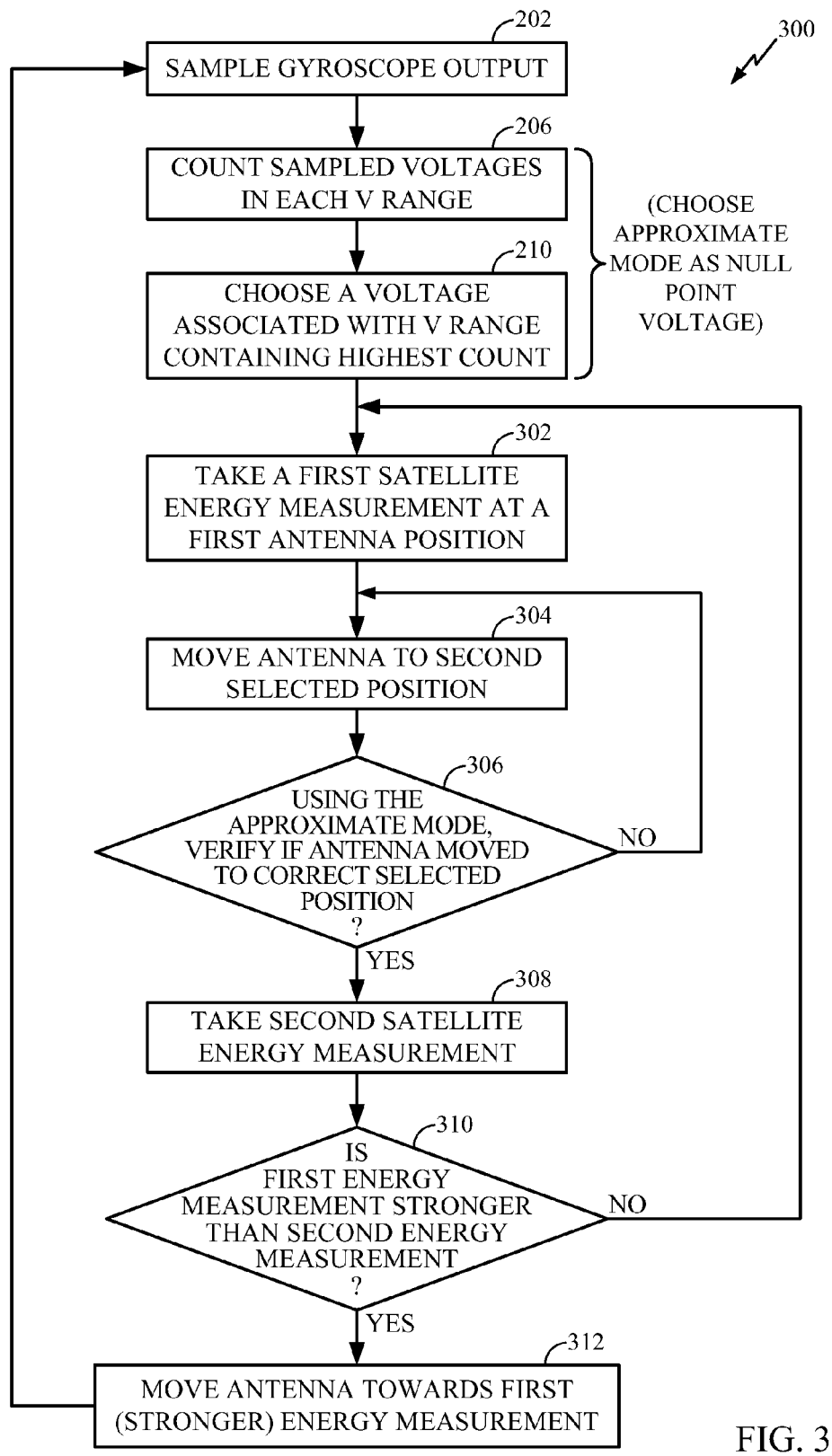
FIG. 3 shows a flow chart of an embodiment of a method for positioning an antenna used with a vehicle towards a preacquired satellite.

FIG. 3 shows a flow chart of an embodiment 300 of a method for positioning an antenna 106 used with a vehicle towards a preacquired satellite 112. The method begins at block 202 where the gyroscope output is sampled, and in a manner similar to that described above, assigned to one of a plurality of voltage ranges (V ranges). At block 206, the sampled voltages in each V range are counted.

At block 210, the voltage associated with a voltage range containing the highest count of sampled voltages is chosen as the approximate mode of the sampled voltages. At block 302, a first satellite energy measurement is taken at a first antenna position, by any known means. At block 304, the antenna 106 is moved to a second selected position. At block 306, a decision is made; using the approximate mode, to verify whether the antenna was moved to the correct second selected position. If the antenna 106 did not move to the correct position, then the method is repeated from block 304 to again move the antenna to the second selected position. If, however, the antenna 106 did move to the correct position, then the method proceeds to block 308 where a second satellite energy measurement is made.

At block 310, a decision is made to determine if the first energy measurement taken was stronger than the second energy measurement taken. If the first energy measurement was not stronger than the second energy measurement the method goes back to block 302 to again take a first satellite energy measurement at a first antenna position. If the first energy measurement was stronger than the second energy measurement, then the method proceeds to block 312, and the antenna 106 is moved towards the first (stronger) energy measurement. After block 312, the whole method repeats starting back at block 202 where the gyroscope 104 output is sampled.

Figure 4:
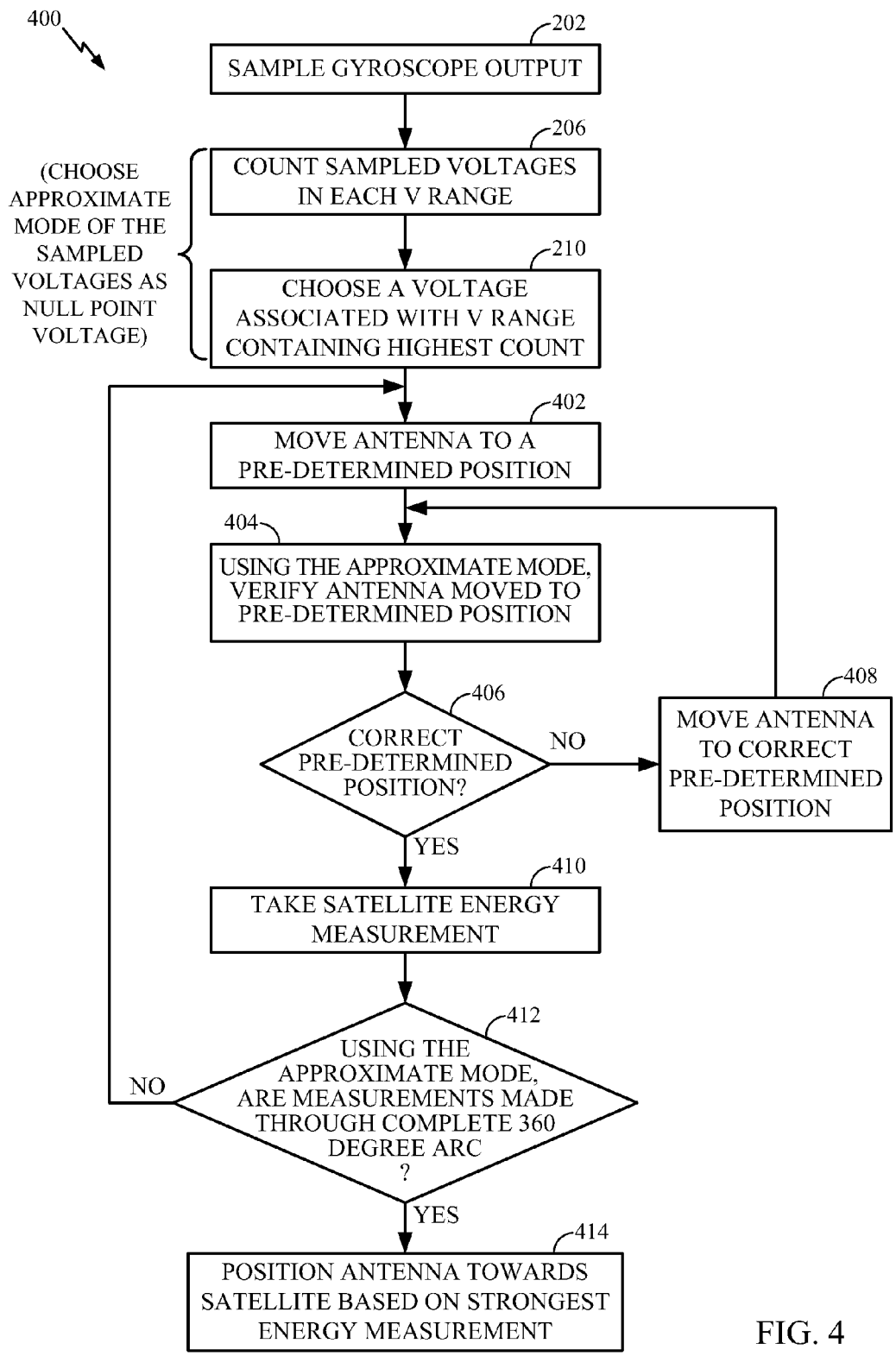
FIG. 4 shows a flow chart of an embodiment of a method for positioning an antenna during a satellite acquisition phase.

FIG. 4 shows a flow chart of an embodiment 400 of a method for positioning an antenna 106 during a satellite acquisition phase 400. The method begins at block 202 where the gyroscope output is sampled, and in a manner similar to that described above, assigned to one of a plurality of voltage ranges (V ranges). At block 206, the sampled voltages in each V range are counted. At block 210, the voltage associated with the V range containing the highest count of sampled voltages is chosen as the approximate mode. At block 402, the antenna is moved to a predetermined position. At block 404, using the approximate mode, it is verified that the antenna 106 moved to the desired predetermined position. For example, if antenna 106 was to be moved 25 degrees to the left, the servo would be instructed to move to that position.

At block 406, a decision is made whether the antenna 106 was moved to the correct predetermined position using the output of the gyroscope 104 to verify whether the antenna 106 was in fact moved 25 degrees to the left. The method then proceeds to block 410 where a satellite energy measurement is taken. If the antenna 106 was not moved to the correct position, then the method proceeds to block 408 to move the antenna 106 to the correct position, and then to block 404 to again verify that the antenna 106 was moved to the correct predetermined position.

After a satellite energy measurement is taken at block 410, a decision is made at block 412; using the approximate mode, if energy measurements have been made through a complete 360 degree arc. Then at block 414 the antenna 106 is positioned towards a satellite 112 based on the strongest energy measurement. As in the previous example, the antenna 106 can be moved via the servo 108, and then the position of the antenna verified to insure that the antenna moved to the predetermined position; in this case, some percentage of a 360 degree arc. If energy measurements have not been made through a complete 360 degree arc, then the method returns to block 402, and the antenna 106 is again moved to a predetermined position.

Figure 5:
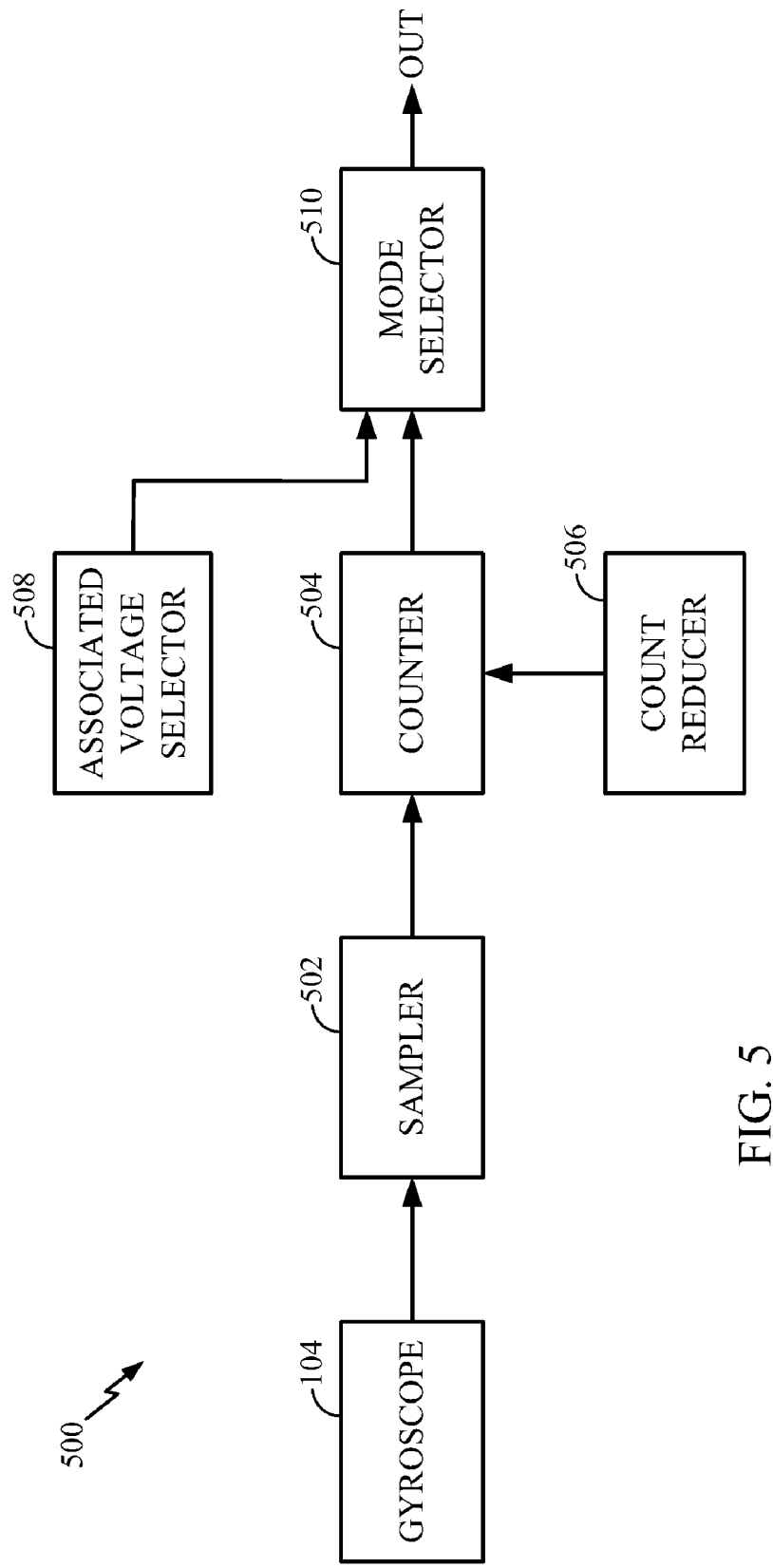
FIG. 5 shows a functional block diagram of an embodiment of an apparatus used to determine the null point of a gyroscope.

FIG. 5 shows a functional block diagram of an embodiment of an apparatus 500 used to determine the null point of a gyroscope 106. It will be appreciated that blocks 502, 504, 506, 508, and 510, may be implemented in any one of a number of ways. For example they may be discrete components, as parts of a bigger circuit using logical components, as all or part of a software embodiment, or the like. The techniques and configurations disclosed may be implemented as ASIC's, FPGA's, or some other hardware-software combination.

The apparatus 500 has a gyroscope 104 having an output that is connected to a sampler 502. The sampler 502 may be implemented via a physical circuit, a logical circuit, firmware, and the like. It may be part of an A/D Converter (analog to digital converter). The sampler 502, if part of an A/D converter, will sample an analog voltage output of a gyroscope 104 and then convert it to a digital signal.

The samples are counted by counter 504, based on where they fall within respective discrete voltage ranges. In order to keep the number of counts accumulated manageable, a count reducer 506 may be used to lower any counts made. This can be done at predetermined or random time intervals, or at a predetermined or random number of accumulated counts.

An approximate mode of the counted samples is selected by mode selector 510. The mode selector 510 uses the associated voltage selector 508, and the count from the counter 504 to choose a voltage associated with the voltage range with the highest count of sampled voltages as the approximate mode.

Figure 6:
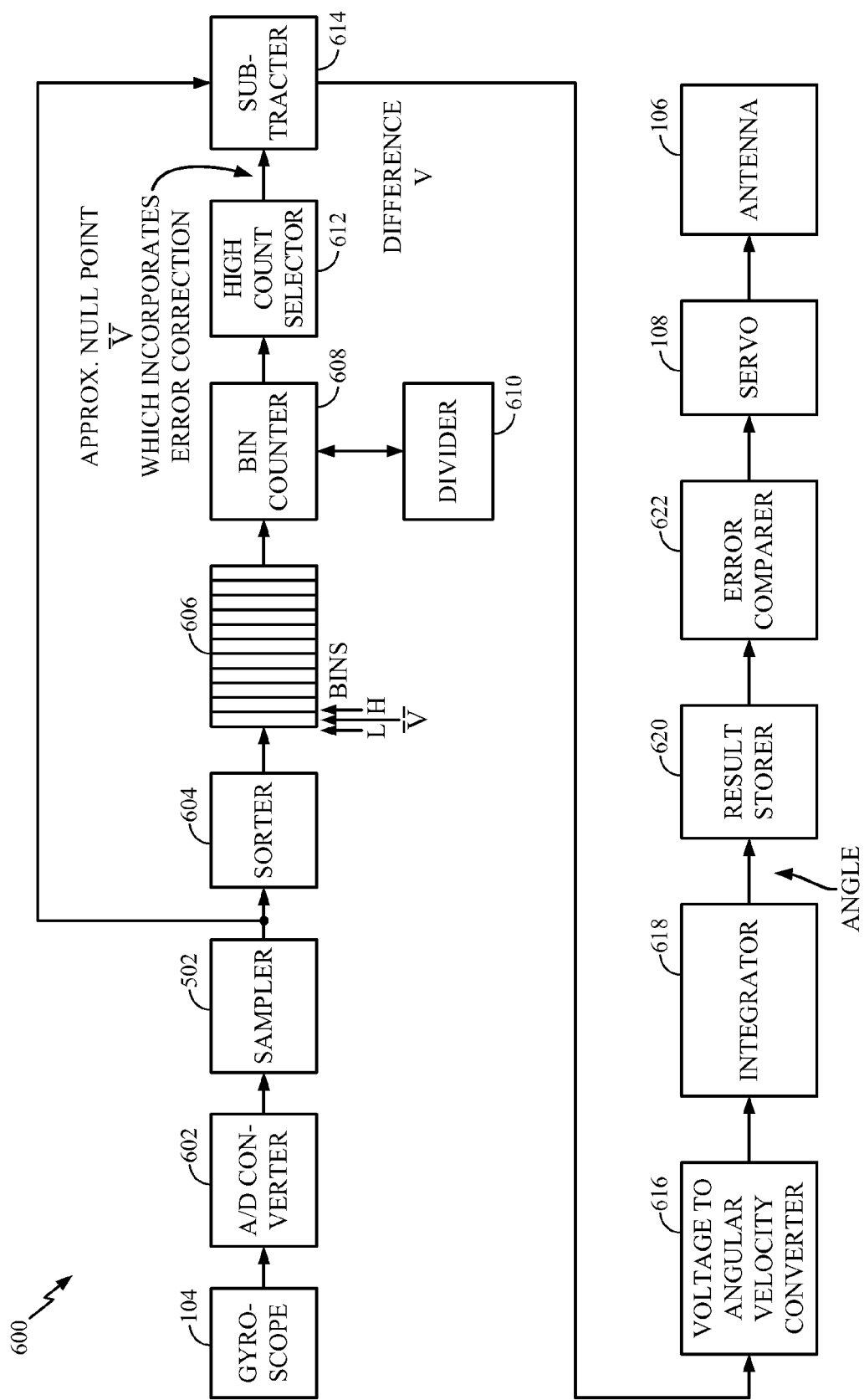
FIG. 6 shows a functional block diagram of an embodiment of a method for using a null point of a gyroscope to correct the angular velocity measurement of the gyroscope in positioning an antenna used with a vehicle.

FIG. 6 shows a functional block diagram 600 of an embodiment of a method for using a null point of a gyroscope to correct the angular velocity measurement of the gyroscope in positioning an antenna used with a vehicle 102. The gyroscope 104 is connected to an A/D converter 602. If the gyroscope 104 is of the type that outputs a digital voltage, then the A/D converter 602 would not be needed, and the gyroscope 104 would be connected directly to the sampler 502. The sampler 502 samples the digital voltage output of the A/D converter 602 (or from the gyroscope 104 if an A/D converter 602 is not needed). It will be understood that there are numerous ways to sample a digital voltage, as well as numerous ways of configuring a sampler. For instance, a discrete electrical circuit may be used, or the sampler may be part of a larger circuit that may or may not include the A/D converter 602. The sampling rate is chosen based on normal engineering design considerations. For instance, the sampling rate may be 600 times per second, or any other appropriate sampling rate.

The output of the sampler 602 is connected to a sorter 604 and to a subtracter 614, described below. Sorter 604 separates the sampled voltages into discrete bins 606. Each bin 606 has a low voltage (L), a high voltage (H), and a single voltage which represents the bin (V). The number of bins will vary depending on the application, as well as the voltage range of each bin. For example, the positive output of an ADXRS401 gyroscope may be used and may be configured to output an approximate voltage that varies between 0.625 Vdc and 4.375 Vdc where 2.5 Vdc is nominal. If 512 bins were desired, then each bin would have approximately a 7.32 mV voltage range ((4.375V−0.625V)/512 bins=7.32 mV). The sorter assigns each voltage sampled to the bin whose voltage range contains the sampled voltage.

The bin counter 608 counts the number of samples the sorter 602 assigns to each bin. As the number of counts accumulates, the number may be reduced by a divider 610 to make the count more manageable. This can be done at predetermined times, or at predetermined counts, or as needed by the user's application. As an example, the count in each bin could be divided by 2 every 2 minutes.

A high count selector 612 selects the representative or associated voltage (V) of the bin with the highest count of sampled voltages as the approximate null point of the gyroscope 104. This can be done at any desired frequency. As an example, the approximate null point could be determined 600 times per second, corresponding to the sampling rate described above. Since the approximate null point of the gyroscope 104 chosen from the bin containing the highest count of sampled voltages is the statistical approximate mode of all the samples taken at some point in time, the approximate null point has already been error corrected. That is, the null point of the gyroscope 104 has been calculated without relying on the predicted null point of the gyroscope 104, as stated by the manufacturer of the gyroscope 104. Therefore, any error in the manufacturer's stated null point due to temperature, humidity, and other environmental or external factors, has been substantially eliminated.

The subtracter 614 is used to reduce the error of sampled voltages caused by an inaccurate null point. The subtracter 614 reduces the error of sampled voltages by subtracting the approximate null point voltage from a sampled voltage to obtain a difference voltage. The difference voltage represents the sampled voltage that has been error corrected. Since the voltage from the gyroscope 104 corresponds to an angular velocity measured by the gyroscope 104, the error corrected voltage sample represents an angular voltage that has also been error corrected.

The voltage to angular velocity converter 616 is used to convert the difference voltage into its corresponding angular velocity. The angular velocity is mathematically integrated in block 618, the result of the integration representing an angle measurement. That is, the angle represents the change in the direction of travel of the truck 102 as measured by the gyroscope 104.

The results of the mathematical integration from the integrator 618 are stored in the result storer 620. The difference (error) between the last angle measured and the current angle measurement are calculated in the error comparer 622. When the error calculated in the error comparer 622 is more than a predetermined threshold, the servo 108 is instructed to move the antenna 106. The predetermined threshold can be chosen based on the user's application. For example, the threshold could be set to ⅔ (0.667) grads. In this example, if the error between the last angle measured and the current angle measurement was more than ⅔ grad, then the stepper motor would be instructed to move 1-full grad, i.e. re-position the antenna by 1-full grad.

Figure 7:
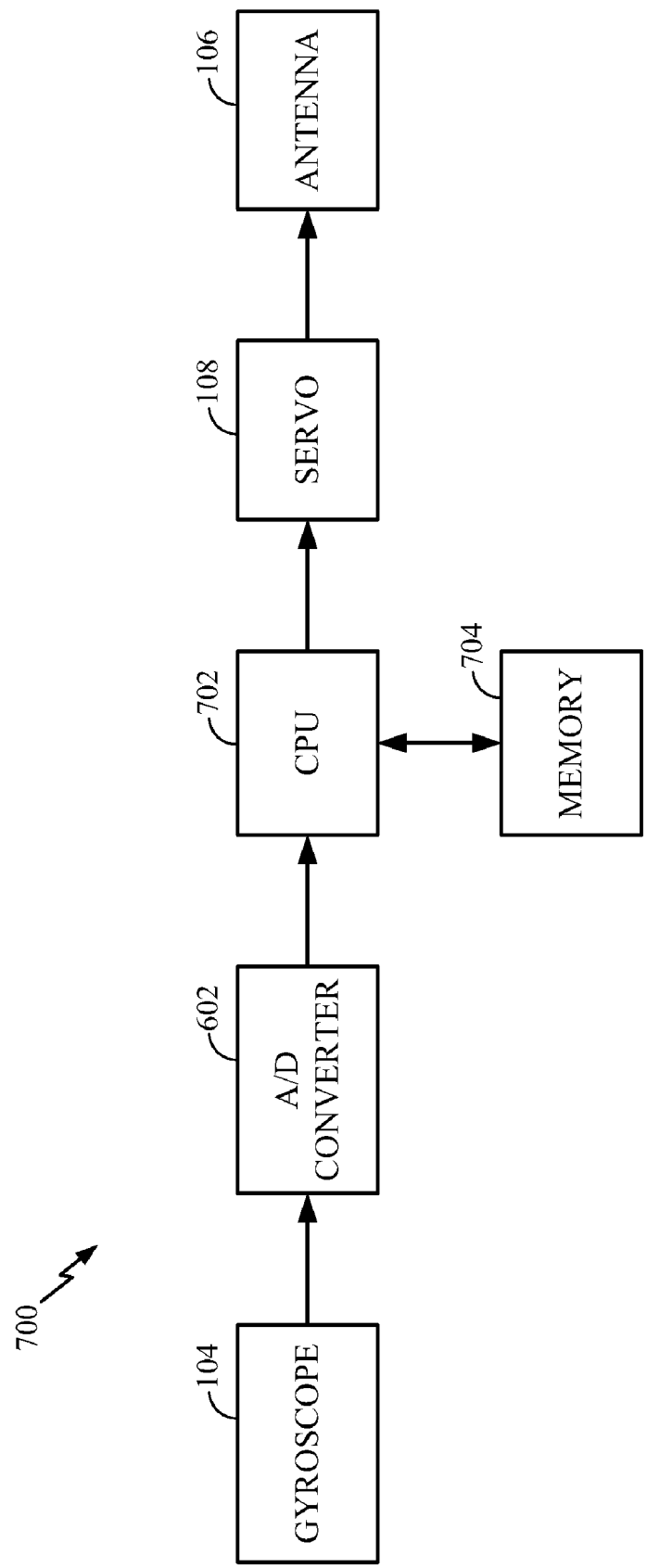
FIG. 7 shows a functional block diagram of a computer implementation of a method for positioning an antenna used with a vehicle.

FIG. 7 shows a functional block diagram 700 of a computer implementation of a method for positioning an antenna used with a vehicle. A gyroscope 104 that produces a voltage in proportion to an angular velocity measured by the gyroscope is connected to an A/D Converter 602 (if necessary). The A/D Converter converts the analog signal from the gyroscope 104 into a digital voltage to be used by the CPU 702. The CPU 702 performs any necessary calculations and may store any intermediary or final results in memory 704. Once the signals are processed by the CPU 702 they may be used to instruct a servo 108 to move an antenna 106 used with a vehicle.

It will be appreciated by those skilled in the art that any method steps described above can be interchanged without departing from the scope of the invention.

We claim:

1. A method for determining a null point voltage of a gyroscope that produces an output voltage related to an angular velocity to be measured by the gyroscope, comprising:
    sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
    counting the sampled voltages in each of the plurality of adjacent discrete voltage ranges; and
    determining an approximate mode of the plurality of sampled voltages as the null point voltage for the gyroscope at least based on determining a voltage associated with one of the plurality of adjacent discrete voltage ranges including the highest count of sampled voltages.

2. The method of claim 1, wherein each of the plurality of adjacent discrete voltage ranges has a low voltage and a high voltage.

3. The method of claim 2 further comprising selecting a predetermined voltage from each discrete voltage range to be the associated voltage.

4. The method of claim 2 wherein said associated voltage is determined for, each discrete voltage range by adding the low voltage to the high voltage to obtain a voltage sum and dividing the voltage sum by a predetermined number.

5. The method of claim 4 wherein the predetermined number is 2.

6. The method of claim 2 wherein the associated voltage is an average of all of the sampled voltages within each discrete voltage range.

7. A method for determining a null point voltage of a gyroscope that produces an output voltage related to an angular velocity to be measured by the gyroscope, comprising:
    sampling the output voltage generated by the gyroscope to obtain a plurality of sampled output voltages, wherein a voltage range provided at an output of the gyroscope is partitioned into a plurality of adjacent discrete voltage ranges, and each of the plurality of sampled output voltages falls within a corresponding one of the plurality of adjacent discrete voltage ranges;
    assigning each sampled output voltage to a respective one of a plurality of bins, each bin representing each of the plurality of adjacent discrete voltage ranges;
    counting a number of sampled output voltages in each bin;
    determining the bin with a highest count; and
    selecting an, associated voltage corresponding to a bin with the highest count for the null point voltage of the gyroscope.

8. The method of claim 7 further comprising reducing the count in each discrete voltage range at a predetermined time.

9. The method of claim 8 wherein the count in each discrete voltage range is divided by 2.

10. The method of claim 7 further comprising reducing the count in each discrete voltage range a number of voltage counts.

11. The method of claim 10 wherein the count in each discrete voltage range is divided by 2.

12. Apparatus for determining a null point voltage of a gyroscope that produces an output voltage related to an angular velocity to be measured by the gyroscope, comprising:
    a sampler configured to sample the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
    a counter configured to count the sampled voltages in each of the plurality of adjacent discrete voltage ranges; and
    a mode selector configured to select an approximate mode of the plurality of sampled voltages as the null point voltage for the gyroscope at least based on determining a voltage associated with one of the plurality of adjacent discrete voltage ranges including the highest count of sampled voltages.

13. The apparatus of claim 12, wherein each of the plurality of adjacent discrete voltage ranges has a low voltage and a high voltage.

14. The apparatus of claim 13 further comprising a determinator configured to determine said associated voltage for each discrete voltage range by adding the low voltage to the high voltage to obtain a voltage sum; and
    a divider configured to divide the voltage sum by a predetermined number.

15. The apparatus of claim 14 wherein the predetermined number is 2.

16. The apparatus of claim 13 wherein the associated voltage is an average of all of the sampled voltages within each discrete voltage range.

17. The apparatus of claim 13 wherein the mode selector is configured to select a predetermined voltage from each discrete voltage range to be the associated voltage.

18. The apparatus of claim 17 further comprising:
    an assignor configured to assign each sampled output voltage to a bin, each bin representing each of the plurality of adjacent discrete voltage ranges;
    the counter is configured to count a number of sampled output voltages in each bin;
    the determinator is configured to determine the approximate mode in each bin; and
    the selector is configured to select the associated voltage corresponding to the bin.

19. The apparatus of claim 18 further comprising a count reducer configured to reduce the count in each discrete voltage range at a predetermined time.

20. The apparatus of claim 19 wherein the count in each discrete voltage range is divided by 2.

21. The apparatus of claim 18 further comprising a count reducer configured to reduce the count in each discrete voltage range a number of voltages in the discrete voltage ranges.

22. The apparatus of claim 21 wherein the count in each discrete voltage range is divided by 2.

23. A non-transitory computer-readable medium, which when executed by a processor, operates to determine a null point of a gyroscope comprising instructions for:
    sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
    counting the sampled voltages in each of the plurality of adjacent discrete voltage ranges; and determining an approximate mode of the plurality of sampled voltages as the null point voltage for the gyroscope at least based on determining a voltage associated with one of the plurality of adjacent discrete voltage ranges including the highest count of sampled voltages.

24. The computer-readable media of claim 23, wherein each of the plurality of adjacent discrete voltage ranges has a low voltage and a high voltage.

25. The computer-readable media of claim 24 further comprising instructions for selecting a predetermined voltage from each discrete voltage range to be the associated voltage.

26. The computer-readable media of claim 25 wherein said instructions for selecting an associated voltage comprise instructions for adding the low voltage to the high voltage for each discrete voltage range to obtain a voltage sum, and for dividing the voltage sum by a predetermined number.

27. The computer-readable media of claim 26 wherein the predetermined number is 2.

28. The computer-readable media of claim 23, wherein said instructions for determining an associated voltage comprise instructions, for finding an average of all of the sampled voltages within each discrete voltage range.

29. A non-transitory computer-readable medium, which when executed by a processor, operates to determine a null point of a gyroscope comprising instructions for:
    sampling the output voltage generated by the gyroscope to obtain a plurality of sampled voltages;
    assigning each sampled output voltage to a respective one of a plurality of bins, each bin representing each of the plurality of adjacent discrete voltage ranges;
    counting a number of sampled output voltages in each bin;
    determining the bin with a highest count; and
    selecting an associated voltage corresponding to a bin with the highest count for the null point voltage of the gyroscope.

30. The computer-readable media of claim 29 further comprising instructions for reducing the count in each discrete voltage range at a predetermined time.

31. The computer-readable media of claim 30 wherein the count in each discrete voltage range is divided by 2.

32. The computer-readable media of claim 29 further comprising instructions for reducing the count in each discrete voltage range a number of voltages in the discrete voltage ranges.

33. The computer-readable media of claim 32 wherein the count in each discrete voltage range is divided by 2.

34. A method for positioning an antenna during a satellite acquisition phase, comprising:
    monitoring a voltage of a gyroscope related to an angular velocity measured by the gyroscope;
    sampling the output voltage to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
    counting the sampled voltages in each of the plurality of adjacent discrete voltage ranges;
    determining an approximate mode of the plurality of sampled voltages as the null point voltage for the gyroscope at least based on determining a voltage associated with one of the plurality, of adjacent discrete voltage ranges including the highest count of sampled voltages;
    moving the antenna through a 360 degree arc;
    using the null point voltage of the gyroscope to verify that the antenna moved through a 360 degree arc;
    taking satellite energy measurements at discrete points throughout the full 360 degree arc; and
    positioning the antenna towards the satellite based on a strongest satellite energy measurement.

35. A method for positioning an antenna used with a vehicle towards a pre-acquired satellite while the vehicle is changing directions, comprising:
    monitoring a voltage of a gyroscope related to an angular velocity measured by the gyroscope;
    sampling the output voltage generated by the gyroscope to obtain a plurality of sampled voltages, wherein a voltage range provided at an output of the gyroscope is partitioned into a plurality of adjacent discrete voltage ranges, and each or the plurality of sampled voltages falls within a corresponding one of the plurality of adjacent discrete voltage ranges;
    counting the sampled voltages in each of the plurality of adjacent discrete voltage ranges;
    determining an approximate mode of the plurality of sampled voltages as the null point, voltage for the gyroscope at least based on determining a voltage associated with one of the plurality of adjacent discrete Voltage ranges including the highest count of sampled voltages;
    taking a first satellite energy measurement;
    moving the antenna in a preselected direction;
    using the null point voltage of the gyroscope to verify that the antenna moved to the preselected direction;
    taking a second satellite energy measurement;
    comparing the first satellite energy measurement to the second satellite energy measurement to see which is stronger; and
    positioning the antenna based on the stronger energy measurement.

36. A system for positioning an antenna used with a vehicle, comprising:
    a gyroscope for producing a voltage based on an angular velocity;
    a sampler configured to sample the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
    a counter configured to count the sampled voltages in each of the plurality of adjacent discrete voltage ranges;
    a mode selector configured to determine an approximate mode of the plurality of sampled voltages as a null point voltage for the gyroscope at least based on determining a voltage associated with one of the plurality of adjacent discrete voltage ranges including the highest count of sampled voltages;
    a subtractor configured to subtract the null point voltage from the sampled output voltage to obtain a voltage difference; and
    a servo configured to position an antenna based on the voltage difference, wherein the positioned antenna is used to determine the vehicle's position.

37. An apparatus for determining a null point voltage of a gyroscope that produces an output voltage related to an angular velocity to be measured, by the gyroscope, comprising:
    means for sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;

means for counting the sampled voltages in each of the plurality of adjacent discrete voltage ranges; and means for determining an approximate mode of the plurality of sampled voltages as the null point voltage for the gyroscope at least based on determining a voltage associated with one of the plurality of adjacent discrete voltage ranges including the highest count of sampled voltages.

38. An apparatus for determining a null point voltage of a gyroscope that produces an output voltage related to an angular velocity to be measured by the gyroscope, comprising:

means for sampling the output voltage generated by the gyroscope to obtain a plurality of sampled output voltages, wherein a voltage range provided at an output of the gyroscope is partitioned into a plurality of adjacent discrete voltage ranges, and each of the plurality of sampled output voltages falls within a corresponding one of the plurality of adjacent discrete voltage ranges;

means for assigning each sampled output voltage to a respective one of a plurality of bins, each bin representing each of the plurality of adjacent discrete voltage ranges;

means for counting a number of sampled output voltages in each bin;

means for determining the bin with a highest count; and means for selecting an associated voltage corresponding to a bin with the highest count for the null point voltage of the gyroscope.

39. An apparatus for determining a null point voltage of a gyroscope that produces an output voltage related to an angular velocity to be measured by the gyroscope, comprising:

a sampler configured to sample the output voltage generated by the gyroscope to obtain a plurality of sampled output voltages, wherein a voltage range provided at an output of the gyroscope is partitioned into a plurality of adjacent discrete voltage ranges, and each of the plurality of sampled output voltages falls within a corresponding one of the plurality of adjacent discrete voltage ranges;

an assignor configured to assign each sampled output voltage to a respective one of a plurality of bins, each bin representing each of the plurality of adjacent discrete voltage ranges;

a counter configured to count a number of sampled output voltages in each bin;

a determinator configured to determine the bin with a highest count; and a selector configured to select an associated voltage corresponding to a bin with the highest count for the null point voltage of the gyroscope.

40. An apparatus for positioning an antenna during a satellite acquisition phase, comprising:

means for monitoring a voltage of a gyroscope related to an angular velocity measured by the gyroscope;

means for sampling the output voltage to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;

means for, counting the sampled voltages in each of the plurality of adjacent discrete voltage ranges;

means for determining an approximate mode of the plurality of sampled voltages as the null point voltage for the gyroscope at least based on determining a voltage associated with one of the plurality of adjacent discrete voltage ranges including the highest count of sampled voltages;

means for moving the antenna through a 360 degree arc;

means for using the null point voltage of the gyroscope to verify that the antenna moved through a full 360 degree arc;

means for taking satellite energy measurements at discrete points throughout the full 360 degree arc; and means for positioning the antenna towards the satellite based on a strongest satellite energy measurement.

41. An apparatus for positioning an antenna during a satellite acquisition phase, comprising:

a monitor configured to monitor a voltage of a gyroscope related to an angular velocity measured by the gyroscope;

a sampler configured to sample the output voltage to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;

a counter configured to count the sampled voltages in each of the plurality of adjacent discrete voltage ranges;

a determinator configured to determine an approximate mode of the plurality of sampled voltages as the null point voltage for the gyroscope at least based on choosing a voltage associated with one of the plurality of adjacent discrete voltage ranges including the highest count of sampled voltages;

servo configured to move the antenna through a 360 degree arc; and a processor configured to:

use the null point voltage of the gyroscope to verify that the antenna moved through a full 360 degree arc, and take satellite energy measurements at discrete points throughout the full 360 degree arc;

wherein the servo is configured to position the antenna towards the satellite based on a strongest satellite energy measurement.

42. A non-transitory computer-readable medium, which when executed by a processor, operates to position an antenna during a satellite acquisition phase comprising instructions for:

monitoring a voltage of a gyroscope related to an angular velocity measured by the gyroscope;

sampling the output voltage to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;

counting the sampled voltages in each of the plurality of adjacent discrete voltage ranges;

determining an approximate mode of the plurality of sampled voltages as the null point voltage for the gyroscope at least based on determining a voltage associated with one of the plurality of adjacent discrete voltage ranges including the highest count of sampled voltages;

moving the antenna through a 360 degree arc;

using the null point voltage of the gyroscope to verify that the antenna moved through a full 360 degree arc;

taking satellite energy measurements at discrete points throughout the full 360 degree arc; and positioning the antenna towards the satellite based on a strongest satellite energy measurement.

43. An apparatus for positioning an antenna used with a vehicle towards a pre-acquired satellite while the vehicle is changing directions, comprising:
  means for monitoring a voltage of a gyroscope related to an angular velocity measured by the gyroscope;
  means for sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
  means for counting the sampled voltages in each of the plurality of adjacent discrete voltage ranges;
  means for determining an approximate mode of the plurality of sampled voltages as the null point voltage for the gyroscope at least based on determining a voltage associated with one of the plurality of adjacent discrete voltage ranges including the highest count of sampled voltages;
  means for taking a first satellite energy measurement;
  means for moving the antenna in a preselected direction;
  means for using the mill point voltage of the gyroscope to verify that the antenna moved to the preselected direction;
  means for taking a second satellite energy measurement;
  means for comparing the first satellite energy measurement to the second satellite energy measurement to see which is stronger; and
  means for positioning the antenna based on the stronger energy measurement.

44. An apparatus for positioning an antenna used with a vehicle towards a pre-acquired satellite while the vehicle is changing directions, comprising:
  a monitor configured to monitor a voltage of a gyroscope related to an angular velocity measured by the gyroscope;
  a sampler configured to sample the output voltage generated by the gyroscope to obtain a plurality of sanipled voltages, wherein a voltage range provided at an output of the gyroscope is partitioned into a plurality of adjacent discrete voltage ranges, and each of the plurality of sampled voitages falls within a corresponding one of the plurality of adjacent discrete voltage ranges;
  a counter configured to count the sampled voltages in each of the plurality of adjacent discrete voltage ranges;
  a determinator configured to determine an approximate mode of the plurality of sampled voltages as the null point voltage for the gyroscope at least based on determining a voltage associated with one of the plurality of adjacent discrete voltage ranges including the highest count of sampled voltages;
  a processor configured to take a first satellite energy measurement;
  a servo configured to move the antenna in a preselected direction,
  wherein the processor is configured to:
  use the null point voltage of the gyroscope to verify that the antenna moved to the preselected direction, and
  take a second satellite energy measurement; and
  a comparator configured to compare the first satellite energy measurement to the second satellite energy measurement to see which is stronger,
  wherein the servo is configured to position the antenna based on the stronger energy measurement.

45. A non-transitory computer-readable medium, which when executed by a processor, operates to position an antenna used with a vehicle towards a pre-acquired satellite while the vehicle is changing directions comprising instructions for:
  monitoring a voltage of a gyroscope related to an angular velocity measured by the gyroscope;
  sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
  counting the sampled voltages in each of the plurality of adjacent discrete voltage ranges;
  determining an approximate mode of the plurality of sampled voltages as the null point voltage for the gyroscope atleast based on determining a voltage associated with one of the plurality of adjacent discrete voltage ranges including the highest count of sampled voltages;
  taking a first satellite energy measurement;
  moving the antenna in a preselected direction;
  using the null point voltage of the gyroscope to verify that the antenna moved to the preselected direction;
  taking a second satellite energy measurement;
  comparing the first satellite energy measurement to the second satellite energy measurement to see which is stronger; and
  positioning the antenna based on the stronger energy measurement.

46. A method for positioning an antenna used with a vehicle, comprising:
  producing a voltage based on an angular velocity;
  sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
  counting the sampled voltages in each of the plurality of adjacent discrete voltage ranges;
  determining an approximate mode of the plurality of sampled voltages as a null point voltage for the gyroscope at least based on determining a voltage associated with one of the plurality of adjacent discrete voltage ranges including the highest count of sampled voltages;
  subtracting the null point voltage from the sampled output voltage to obtain a voltage difference; and
  positioning an antenna based on the voltage difference, wherein the positioned antenna is used to determine the vehicle's position.

47. An apparatus for positioning an antenna used with a vehicle, comprising:
  means for producing a voltage based on an angular velocity;
  means for sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;
  means for counting the sampled voltages in each of the plurality of adjacent discrete voltage ranges;
  means for determining an approximate mode of the plurality of sampled voltages as a null point voltage for the gyroscope at least based on determining a voltage associated with one of the plurality of adjacent discrete voltage ranges including the highest count of sampled voltages;

means for subtracting the null point voltage from the sampled output voltage to obtain a voltage difference; and means for positioning an antenna based on the voltage difference, wherein the positioned antenna is used to determine the vehicle's position.

48. A non-transitory computer-readable medium, which when executed by a processor, operates to position an antenna used with a vehicle comprising instructions for:

producing a voltage based on an angular velocity;

sampling the output voltage generated by the gyroscope to obtain a plurality of sampled voltages, wherein a voltage range provided at an output of the gyroscope is partitioned into a plurality of adjacent discrete voltage ranges, and each of the plurality of sampled voltages falls within a corresponding one of the plurality of adjacent discrete voltage ranges;

counting the sampled voltages in each of the plurality of adjacent discrete voltage ranges;

determining an approximate mode of the plurality of sampled voltages as a null point voltage for the gyroscope at least based on determining a voltage associated with one of the plurality of adjacent discrete voltage ranges including the highest count of sampled voltages;

subtracting the null point voltage from the sampled output voltage to obtain a voltage difference; and positioning an antenna based on the voltage difference, wherein the positioned antenna is used to determine the vehicle's position.

* * * * *